Nov. 25, 1958     O. WINKLE ET AL     2,861,465
CHANGE SPEED GEAR OPERATING SYSTEM
Filed Feb. 16, 1953     3 Sheets-Sheet 1
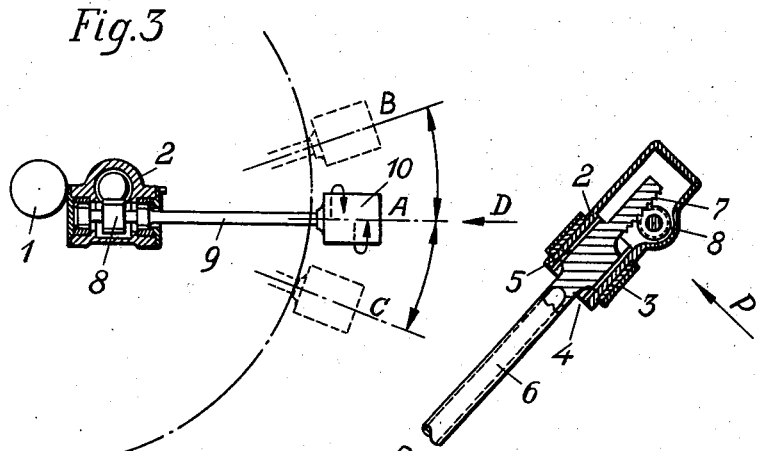
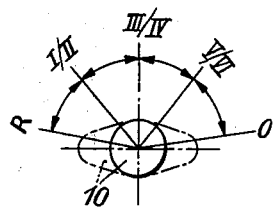
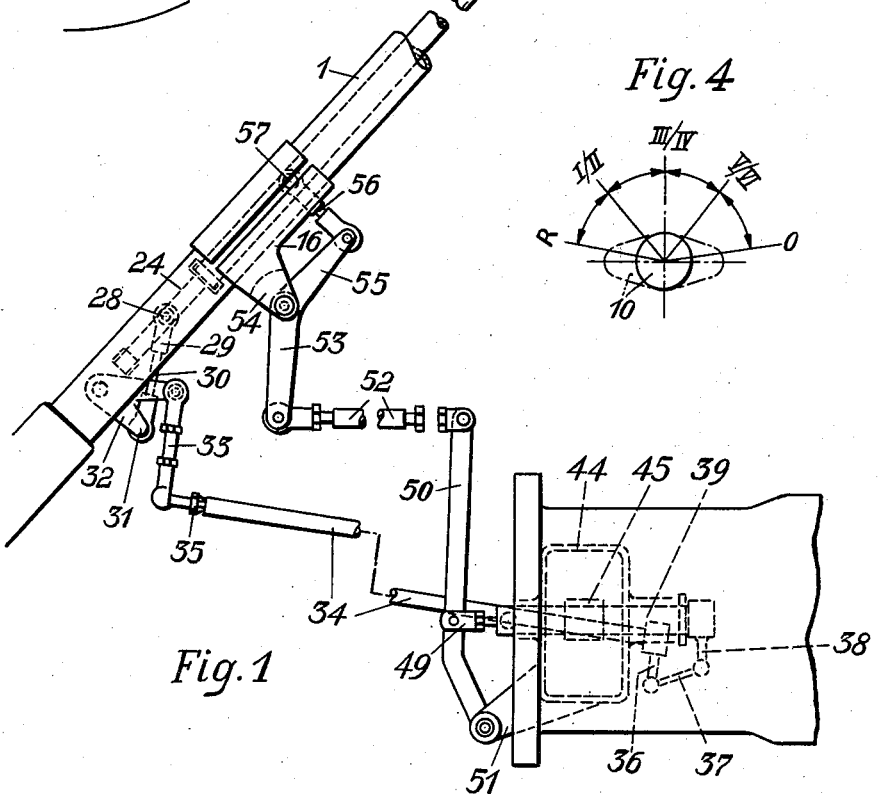
INVENTORS
OTTMAR WINKLE
AND
JULIUS LIEBEL
BY Bailey, Stephens & Huettig
ATTORNEYS Nov. 25, 1958  O. WINKLE ET AL  2,861,465
CHANGE SPEED GEAR OPERATING SYSTEM
Filed Feb. 16, 1953  3 Sheets-Sheet 2
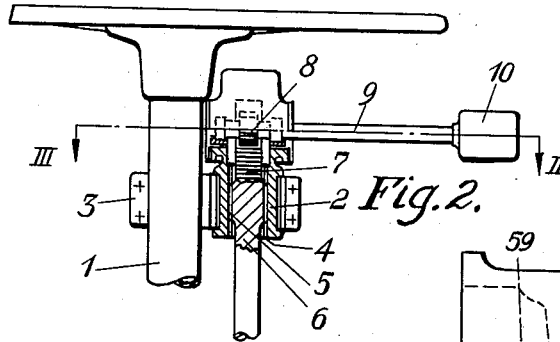
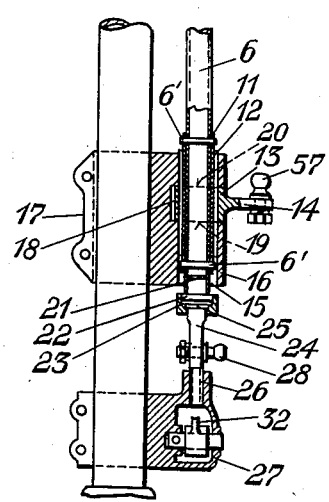
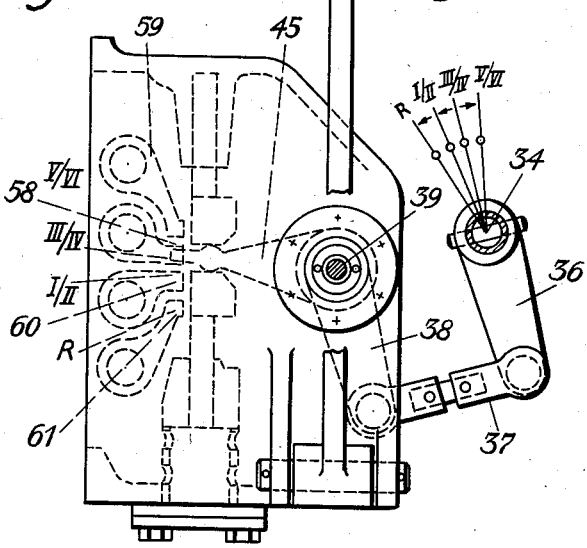
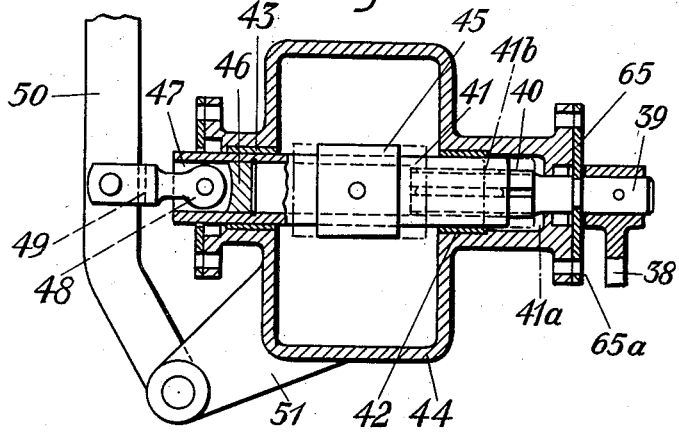
INVENTORS
OTTMAR WINKLE
AND
JULIUS LIEBEL
BY Bailey, Stephens & Huettig
ATTORNEYS

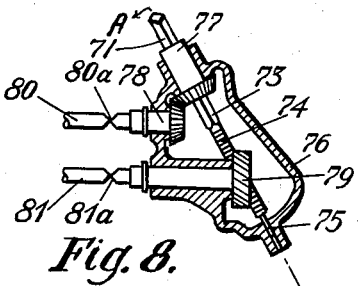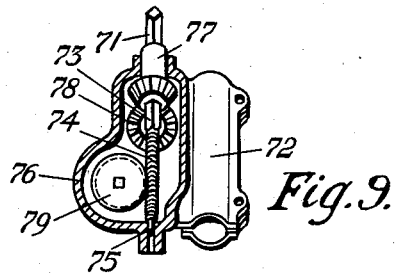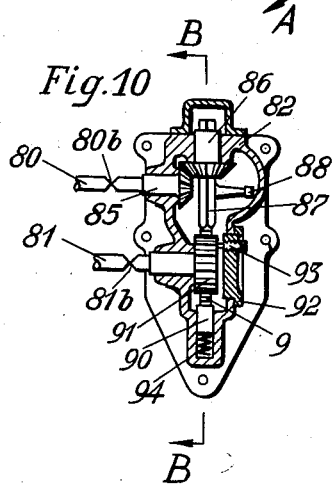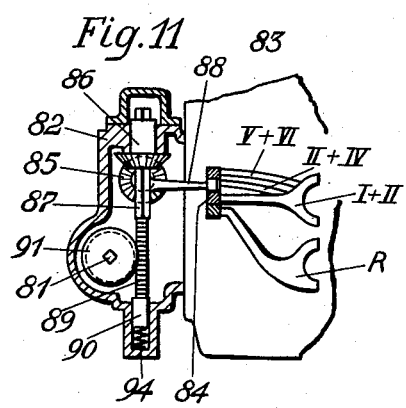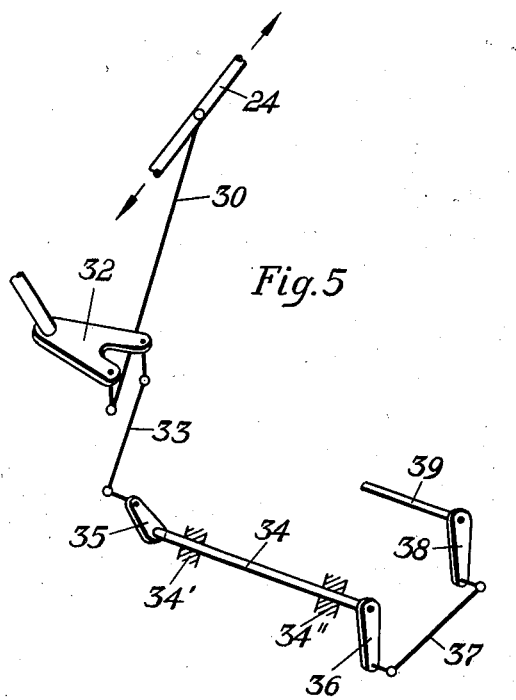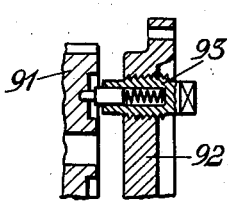

United States Patent Office 2,861,465
Patented Nov. 25, 1958

2,861,465

CHANGE SPEED GEAR OPERATING SYSTEM

Ottmar Winkle and Julius Liebel, Nurnberg, Germany, assignors to Maschinenfabrik Augsburg-Nurnberg A. G., Nurnberg, Germany Application February 16, 1953, Serial No. 337,106

Claims priority, application Germany February 14, 1952

4 Claims. (Cl. 74—473)

This invention relates to a gear shifting system for motor vehicles, and has particular reference to a system of the type in which the gear shift lever is combined with the steering wheel or with the steering columns.

It is an object of the present invention to provide a gear shifting system which is particularly adapted for trucks or omnibusses having a relatively high number of different speeds.

A further object of the invention is to facilitate operation of the gear shifting means, to increase the safety of operation and to save operating space.

A still further object of the invention is to provide a gear shifting system whose gear shift lever has a relatively small angle of deflection.

Still another object of the invention is to provide a gear shifting system permitting a reliable transmission of the shifting movements even at relatively large distances and through non-linear paths, with relatively small mechanical forces, especially without servomotor forces.

A still further object of the invention is to provide a gear shifting system which is of relatively simple construction and operation, easy and cheap to manufacture, and of relatively small weight occupying small space.

With these and further objects in view, according to the present invention, the gear shifting system is arranged in such a way that the first shifting motion of the gear shift lever is exerted by swinging the gear shift lever in one plane, while the second shifting motion is exerted by turning the gear shift lever about its own axis, or vice versa.

More particularly, the gear shifting system is constructed in such a way that the gear shift lever is arranged below the steering wheel so as to carry out the following motions:

(1) A pivotal movement in a plane parallelly to the plane of the steering wheel, about a neutral position, in a forward and rearward direction of the vehicle, so as to shift the respective parts in the gear system (gear wheel or claw coupling or the like), and (2) A rotary movement about its own axis as it is located in the neutral position of its pivotal movement corresponding to non-engagement of the gear wheels, for selecting the respective shifting channel. The term "shifting channel" or "shift movement channel" for the purpose of the present specification is intended to refer to the shifting movements of the gear shift blocks or their operating means in a plurality of parallel directions each of which corresponds to one "shifting channel" or "shift movement channel."

According to a further feature of the invention the two different types of motions required for the gear shifting are transmitted to a remote change speed gear through rotary transmitting members in the form of rotary motions and reconverted at the change-speed gear into a control motion adapted to the construction of the gear.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a side view, partly in section, showing one embodiment of the invention, Fig. 2 is a view in the direction of arrow P of Fig. 1, partly in section, Fig. 3 is a section on line III—III of Fig. 2, Fig. 4 is a diagrammatic view indicating the movements of the gear shift lever, as viewed in the direction D of Fig. 3, Fig. 5 is a perspective view of a part of the device of Fig. 1, Fig. 6 is a side view showing the arrangement and the selection of the shifting channels of a change speed gear, Fig. 7 is an axial section showing the adjustment of the shifting channel, Fig. 8 is a central section showing the "transmitter" part of a gear shifting system having the invention applied thereto, Fig. 9 is a section on line A—A of Fig. 8, Fig. 10 is a central section of the "receiver" part of a gear shifting system having the invention applied thereto, Fig. 11 is a section on line B—B of Fig. 10, Fig. 12 is a detail of the construction as per Figs. 10 and 11 on a larger scale.

Similar reference numerals denote similar parts in the different views.

Referring now to the drawings in greater detail, and first to Figs. 1 and 2, it will be seen that a clip 3 which is fixedly mounted on the stationary outer tube of the steering column 1, as by screws, embraces a shifting head 2 in such a way that the latter can be rotated about its axis which is parallel to the steering column. The shifting head is held against axial displacement with respect to the clip 3 by axial end collars engaging the end faces of the clip. The cylindrical part of the shifting head 2 is provided with an internal toothing 4 in the form of grooves which are permanently engaging a correspondingly shaped splined part 5 of a round bar 6. The upper end of member 5 forms a toothed rack 7 meshing with a pinion 8 fixedly mounted on a gear shift lever 9 which is mounted in the gear shift head 2 on both sides of the pinion so as to be secured against axial shifting. The end of the gear shift lever 9 projecting from the gear shift head bears a handle 10 which is fixedly connected therewith and preferably formed with an oval cross section.

The lower end of the bar 6, Fig. 2, extends through a sleeve 11 and is connected therewith by pins 6'. The part of the sleeve 11 disposed between the pins 6' is reinforced in diameter and provided with splines 12 and intermediate grooves on which a hub 13, formed with complementary splines and grooves, of a lever 14 is slidably fitted. The sleeve 11 is freely movably seated in the bore 15 of a bearing 16, whose clips 17 embrace the stationary casing tube of the steering column 1 and are clamped thereon by screws or the like.

Transversely to the axial direction of the bore 15 the bearing 16 has a recess 18 with lateral end surfaces 19 and 20 which are parallel to each other and guide the said lever 13 between them.

The lower end of the sleeve 11 is shrunk on a pin or journal 21 whose collar 22 engages the end face of the sleeve 11 and is formed with a thread on which a cap 23 is threadably fixed. Said cap 23 is fitted over a second rod 24 whose end is extended to a collar 25 resting against the inside of a turned groove of the cap 23 which thus prevents the rod 24 from slipping out of the cap. Owing to the connection of the rods 6 and 24 by the pin 21, 22 and the cap 23 the rod 24 takes part in the axial motion of the rod 6 while rod 24 remains in its actual position when rod 6 is turned about its axis. Outside of the cap 23 rod 24 passes over into a rectangular cross section and is guided in an opening 26 of a bearing member 27 corresponding to this rectangular cross section, whereby the rod 24 is always held in the same angular position in relation to the bearing member even in case of a rotation of the rod 6. A spherical head 28 is fixedly connected to the rod 24 above the bearing member 27, said spherical head forming a ball joint together with the suitably shaped end 29 of a rod 30 of adjustable length. Connected to the opposite end of the rod 30 is a further hollow ball joint member 31 cooperating with a spherical head fixedly arranged on a bell crank 32, Figs. 1, 2, and 5. The lever 32 is rotatably mounted in the bearing member 27. The bearing member 27 itself embraces the steering column 1 and is clamped thereto by said clips and screws.

A further ball joint connection is provided by an adjustable rod 33, between lever 32 and a lever 35 fixedly mounted on a shaft 34, Figs. 1, 5, 6, whose bearings are indicated at 34' and 34'' in Fig. 5. A lever 36 secured against rotation on the opposite end of shaft 34 is coupled through a further adjustable ball joint-rod connection 37 with a lever 38 fixedly mounted on a shaft member 39 which is operatively connected with a hollow shaft 41 by means of a splined coupling 40, Fig. 7, permitting axial sliding but preventing angular movement between the shafts 39 and 41. By means of retaining discs 65, 65a the shaft member 39 itself is prevented from axial movement in the gear box 44. The hollow shaft 41 is slidably held in bearings 42 and 43 of the gear box 44 and carries within the same a gear shifting finger or selector member 45, Figs. 6 and 7, which in the position shown in Fig. 6 engages in the gear shift fork of the gear shift block 58 for the third and fourth speed (III/IV). However, under certain conditions the gear shift finger 45 is also able to engage in the gear shift forks of the gear shift block 59 for the fifth and sixth speed (V/VI) or of the gear shift block 60 for the first and second speed (I/II) or of the gear shift block 61 for the reverse ("R"), as will be hereinafter described.

Inserted in the opening at the free end of the hollow shaft 41, so as to be rotatable but not axially shiftable therein, is a piston-shaped driving member 46 in whose slot 47 extending in a diametral direction, engages an eye 48 of a fork member 49 which is jointed thereto. The fork part of the fork member 49 is jointed to a lever 50 mounted on a bearing bracket projection 51 of the gear box 44. The free end of lever 50 is jointed, by an adjustable rod 52, to one arm 53 of a bell crank 53, 55, Fig. 1, which is mounted on a projection 54 of the bearing 16. The free arm 55 of the angle lever 53, 55 in turn is jointed, by means of an adjustable bar 56 having ball joints at its ends, through a spherical head 57, with the lever 14.

The operation of the gear shift system hereinbefore described is as follows:

In order to put in the first speed, the handle 10, Figs. 2, 3, 4, will be rotated from the position of rest O, Fig. 4, up to the first stop marked I/II in Fig. 4, in an anticlockwise direction. The gear shift finger 45 thereby releases the gear shift block 58 and engages into the fork of the gear shift block 60 by action of the train of links 10, 9, 8, 7, 6, 21, 22, 23, 25, 24, 28, 30, 31, 32, 33, 35, 34, 36, 37, 38, 39, while the rod 6 slides with its splined profile in the complementary profile of the hub 13 of the lever 14, without exerting any effect thereby. The gear shift lever 9 is then swung about the axis of shaft 6 in an anticlockwise direction into the position B, Fig. 3. The rod 6 follows this motion owing to the interlocking splines 4, 5 of the rod 6 and of the gear shift head 2, taking with it the lever 14, in the same direction, owing to the splined shaft coupling between said parts. The swinging motion of lever 14 is transmitted, through the train of operatively connected links 14, 57, 56, 55, 53, 52, 50, 48, 47, onto the hollow shaft 41, Fig. 7, whereby the latter together with the gear shift finger 45 mounted on it is moved into the position 41a shown in dot and dash lines, Fig. 7. The moving finger 45 takes the gear shift block 60 with it into the position of speed I. In order to put in speed II, the gear shift lever 9 is next swung from the position B, Fig. 3, through the position A into the position C, thereby causing an opposite motion of the above mentioned train of control links and shifting the hollow shaft 41 into the position 41b, Fig. 7. The gear shift finger 45 which is rigidly connected to the hollow shaft 41 thus moves the gear shift block 60 into the position II. If it is now intended to pass over to the third speed (III), the gear shift lever 9 is swung back to its initial position A and rotated back about its own axis in a clockwise direction into the initial position at the beginning of the gear shift operations, as per Fig. 4. By the return to A the second speed (II) is thrown out through the train of links 14, 57, 56, 55, 53, 52, 50, 48, 47, 46, 41, 45. The rotation of handle 10 about its own axis through the train of links 10 to 6, 21 to 25, 28, 30 to 39 causes engagement of the gear shift finger 45 into the gear shift block 58 for the third and fourth speeds (III and IV). Now the control lever 9 is swung into the position B and the third speed (III) is thus put in. In order to change over to the fourth speed (IV), the control lever 9 is swung from its position B, Fig. 3, into the position C.

In order to change over to the fifth speed (V), the control lever 9 is moved into the central or neutral position A, whereby the fourth speed (IV) is thrown out. Then the handle 10 is rotated in a clockwise direction (position V/VI in Fig. 4) and the gear shift finger 45 engaged into the gear shift block 59 by the train of links 10 to 6, 21 to 25, 28 to 39. If the control lever 9 is now swung from the position A, Fig. 3, into the position B, the fifth speed (V) is put in. If the control lever 9 is thereafter moved into the position C, the sixth speed (VI) is put into effect.

If it is intended to put in the "reverse," the gear shift lever 9 upon turning of handle 10 in an anticlockwise direction into the extreme position R, Fig. 4, will be swung into the position C, Fig. 3.

When a speed is put in, a change of the gear shift channel by rotation of the handle 10 is prevented on account of the respective gear shift blocks 58 to 61 which are adjacent to the respective position of the gear shift finger 45 and act as lateral limitations for the same, and the centering effect of the per se known stops (not shown) for the individual gear shift channel positions. However, in order to completely prevent movement of the gear shift finger 45 with gears engaged and careless operation of the gear shift lever 9 by turning the handle 10—which movement would still be possible although being ineffective—a per se known locking device, not shown, may be provided which becomes effective automatically when the gears are engaged.

The diagram of motions shown in Fig. 4 indicates the range of rotation of the handle 10 which is preferred for this embodiment of the invention.

In the second embodiment of the invention a gear box 76 is secured to the casing tube (not shown) of the steering column by means of a clip 72, Fig. 9. Mounted in the gear box 76 is the cylindrical hub of a bevel wheel 77, Figs. 8, 9. Through the square hole of the bevel wheel 77 extends the square portion 73 of a rod 71 whose upper part can be operated, in the manner as illustrated in Figs. 1 to 3, by the gear shift lever 9, 10. The lower part of the rod 71 extending from the square part is formed as a round toothed rack 74, terminating in a cylindrical journal 75 which in turn is guided in a bearing of the casing 76.

The bevel wheel 77 meshes with a bevel wheel 78 whose hub is also rotatably but non-shiftably mounted in the gear box 76. The round toothing 74 of rod 71 meshes with a spur wheel 79 whose hub the same as the hubs of the bevel wheels is mounted for rotation in the gear box 76.

Connected to the hub of the bevel wheel 78, Fig. 8—if desired with insertion of a Cardan joint 80a—is a transmission shaft 80 whose opposite end—advantageously again through a Cardan joint 80b, Fig. 10—is fixedly connected to the hub of a bevel wheel 85, Figs. 10, 11, which is mounted for rotation but secured against axial shifting in a cover 82. In the same way a further bevel wheel 86 and a spur wheel 91 are mounted in the cover 82 which is mounted and secured on the change speed gear casing 83 containing the members required for moving the gear shift members 84 for the various speeds.

The bevel wheels 85, 86 are in gear with each other. The bevel wheel 86 has a central square hole for slidable motion therein of the square portion 87 of a gear shift finger shaft operating the gear shift finger 88 and including a round toothed rack 89 terminating in a cylindrical journal 90 which is mounted for rotation and longitudinal shifting in a corresponding bore of the cover 82. The load exerted by the gear shift finger shaft 87 is entirely or partly compensated by a compression spring 94 provided below, and acting on the lower end of, journal 90.

The free end of a further transmission shaft 81 which is fixedly connected with the hub of a spur wheel 79, Fig. 8, is coupled with the hub of the spur wheel 21, Figs. 10 and 11. Here again, it is preferred to insert Cardan joints 81a, 81b between the toothed wheels 79, 91 and the transmission shaft 81. The hub of the spur wheel 91 the same as that of the bevel wheel 85 is mounted in the cover 82 so as to be free for rotation only. The spur wheel 91 is in permanent mesh with the round toothed rack 74 of the gear shift finger shaft 87.

Provided in the cover 82, opposite to spur wheel 91, is an assembling cover 92, Figs. 10, 12, having a spring-loaded stop pin 93, a ball or the like, adapted to catch in corresponding recesses (e. g., depressions) on the end face of the wheel 91.

The gear shift finger 88 engages in the forked portions of the gear shift members 84, Fig. 4, and is prevented, in per se known manner, by means of a lock bolt (not shown) releasing always only one of the members 84, from moving simultaneously more than one member 84.

The operation of this system is as follows:

If the hand lever (not shown) is swung in a plane parallelly to the steering wheel, a rotary motion of the shaft 71, Figs. 8 and 9, is caused, which motion is transmitted by the bevel wheels 77, 78 to the transmission shaft 80, see also Fig. 10, which in turn through bevel wheel 85 operates the bevel wheel 86, in the rotation of which participates the gear shift finger shaft 87 with the gear shift finger 88, Figs. 10 and 11, whereby the gear shift member 84 engaged by said finger at the respective moment is shifted and a gear put in or thrown out.

If the rod 71, Figs. 8 and 9, is longitudinally shifted by rotation of the hand lever 9, 10 about its axis, for selection of the desired gear shift channel, the round toothing 74 of rack 71 with the bevel wheel 77 stationary will drive the spur wheel 79. This rotary motion of the spur wheel 79 by means of the transmission shaft 81, Figs. 8, 10, 11, is imparted to the spur wheel 91 which in turn actuates the round toothed rack 89 of the gear shift finger shaft 87, lifting or lowering the same. As a result, the gear shift finger 88 is shifted from one gear shift channel of a gear shift member 84 into another gear shift channel of another gear shift member 84. The finding of the gear shift channels for the gear shift member 84 associated to the speeds I, II/III, IV/V, VI/R is facilitated by the catch device 93, 91. The fixing holes for the assembling cover 92 are in the form of kidney-shaped or reniform oblong holes whereby the adjustment of the catch device in relation to the position of the gear shift members 84 is greatly facilitated.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

We claim:

1. A change speed gear system for motor vehicles comprising a plurality of gear shaft blocks each of which is axially shiftable from a central non-operative position into either of two different operative positions to selectively put in either of two different speeds, a selector member which is movable into its operative position with respect to any of said gear shift blocks by movement in a first spatial dimension and adapted to move the respective gear shift block into either of its operative positions by movement in a second spatial dimension, a gear shift lever adapted to be pivoted in one plane and to be rotated about its longitudinal axis, first rotary transmission means for transmitting the rotary movements of the gear shift lever through a considerable distance to the selector member in a form adapted for causing movement thereof in one of said two spatial dimensions, said first rotary transmission means including a first gear for converting the rotary movements of the gear shift lever into rotary movements of the first rotary transmission means and a second gear for converting the movements of the first rotary transmission means into movements of the selector member, second rotary transmission means for transmitting the pivotal movements of the gear shift lever through the said distance to the selector member in a form adapted for causing movement thereof in the other of said two spatial dimensions, said second rotary transmission means including a third gear arranged separately from the first gear and adapted for converting the pivotal movements of the gear shift lever into rotary movements of the second rotary transmission means, and a fourth gear arranged separately from the second gear and adapted for converting the rotary movements of the second rotary transmission means into movements of the selector member.

2. In a motor vehicle, a steering system comprising a steering wheel and a steering column, a change speed gear arranged at a distant plane of the vehicle in relation to the steering column and adapted to be controlled by two different sorts of control movements, i. e. preparatory control movements for selecting the desired shift movement channel of the gear and shift movements, a gear shift lever adapted to be pivoted in one plane and to be rotated about its longitudinal axis, bearing means for said gear shift lever, means for securing said bearing means to the steering column, first rotary transmission means, a first gear arranged on the steering column for converting the rotary movements of the gear shift lever into rotary movements of the first rotary transmission means, a second gear arranged at the change speed gear, means actuated by said second gear for converting the rotary movements of the first rotary transmission means into one of said control movements, second rotary transmission means, a third gear arranged on the steering column for converting the pivotal movements of the gear shift lever into rotary movements of the second rotary transmission means, a fourth gear arranged at the change speed gear, and means actuated by said fourth gear for converting the rotary movements of the second rotary transmission means into the other of said control movements.

3. In combination with a change speed gear system for motor vehicles adapted to be controlled by preparatory control movements for selecting the desired shift movement channel and shift movements, a gear shift lever adapted to be pivoted in one plane and to be rotated about its longitudinal axis, gear and rotating shaft means for transmitting the rotary movements of the gear shift lever to the gear system for effecting the preparatory control movements, gear and rotating shaft means for transmitting the pivotal movements of the gear shift lever to the gear system for effecting the shift movements, and catch means combined with said gear shift lever for sensibly marking the positions thereof coordinated to the various shift movement channels.

4. A change speed gear system for motor vehicles comprising a plurality of gear shift blocks each of which is axially shiftable from a central non-operative position into either of two different operative positions to selectively put in either of two different speeds, a selector member which is movable into its operative position with respect to any of said gear shift blocks by movement in a first spatial dimension and adapted to move the respective gear shift block into either of its operative positions by movement in a second spatial dimension, a gear shift lever adapted to be pivoted in one plane and to be rotated about its longitudinal axis, a shaft rotatably and longitudinally joined to said lever, first rotary transmission means for transmitting the rotary movements of the gear shift lever and upon movement of said shaft thereby through a considerable distance to the selector member in a form adapted for causing movement thereof in one of said two spatial dimensions, and second rotary transmission means for transmitting the pivotal movements of the gear shift lever and upon movement of said shaft thereby through the said distance to the selector member in a form adapted for causing movement thereof in the other of said two spatial dimensions.

References Cited in the file of this patent

UNITED STATES PATENTS

| | | |
|---|---|---|
| 1,992,419 | Girardi | Feb. 26, 1935 |
| 2,312,975 | Peterson | Mar. 2, 1943 |
| 2,319,716 | Bixby | May 18, 1943 |
| 2,497,930 | Creson | Feb. 21, 1950 |

FOREIGN PATENTS

| | | |
|---|---|---|
| 761,617 | France | Mar. 23, 1934 |